United States Patent [19]

Holtz et al.

[11] 4,082,518
[45] Apr. 4, 1978

[54] ADDITIVES FOR MOTOR FUELS AND LUBRICANTS

[75] Inventors: Hans D. Holtz; William T. Nelson; Albert N. Devault, all of Bartlesville, Okla.

[73] Assignee: Phillips Petroleum Company, Bartlesville, Okla.

[21] Appl. No.: 571,901

[22] Filed: Apr. 28, 1975

[51] Int. Cl.² .............................................. C10L 1/22
[52] U.S. Cl. ........................................... 44/72; 44/62; 252/50
[58] Field of Search ................................ 44/58, 72, 62; 260/583 P, 583 K, 465.9, 465.8 R; 252/50; 268/878 R

[56] References Cited

U.S. PATENT DOCUMENTS

| | | | |
|---|---|---|---|
| 2,657,191 | 10/1953 | Coover, Jr. | 260/878 R |
| 2,841,569 | 7/1958 | Rugg et al. | 260/878 R |
| 2,879,253 | 3/1959 | Coover, Jr. | 260/878 R |
| 3,438,757 | 4/1969 | Honnen et al. | 260/583 R |
| 3,574,576 | 4/1971 | Honnen et al. | 250/50 |
| 3,723,316 | 3/1973 | Massie | 250/50 |
| 3,840,583 | 10/1974 | Turk et al. | 260/465.9 |
| 3,898,268 | 8/1975 | Drake | 260/465.9 |
| 3,953,348 | 4/1976 | Lee | 252/50 |
| 4,031,015 | 6/1977 | Miller | 252/50 |

*Primary Examiner*—Daniel E. Wyman
*Assistant Examiner*—Mrs Y. Harris-Smith

[57] ABSTRACT

Improved additives for motor fuels and lubricants are provided comprising low molecular weight hydrogenated liquid polymers containing low levels of combined nitrogen. More specifically, hydrogenated adducts formed from normally liquid low molecular weight polydiolefins and acrylonitrile are excellent additives for motor fuels and lubricants. Motor fuels and lubricating oil compositions containing said additives are also provided.

6 Claims, No Drawings

ADDITIVES FOR MOTOR FUELS AND LUBRICANTS

This invention relates to improved additives for motor fuels and lubricants. In one aspect, this invention relates to the preparation of novel compositions formed from hydrogenated adducts of normally liquid low molecular weight polydiolefins reacted with acrylonitrile. In another aspect, this invention relates to motor fuel compositions containing as an additive the hydrogenated adduct formed by contacting a low molecular weight polymer of a conjugated diene with acrylonitrile and hydrogenating the product. In accordance with another aspect, this invention relates to lubricant compositions containing as an additive low molecular weight hydrogenated liquid polymers of conjugated dienes containing low levels of combined nitrogen. In a further aspect, this invention relates to a process for the preparation of improved additives for motor fuels and lubricants comprising forming an adduct from a low molecular weight normally liquid polymer of a conjugated diene and acrylonitrile, hydrogenating the resulting adduct, and recovering the additive from the resulting reaction mixture.

At the present time it is common practice to enhance or modify certain of the properties of lubricating oils through the use of various additives or improvement agents. The lubricating oils employed in internal combustion engines, such as automotive, light aircraft, and diesel engines, in particular, require the use of additive agents to render them serviceable under the adverse environmental conditions frequently encountered in the operation of these engines. Among the various additives employed in modern engine oils, one of the most important is the type which acts to prevent accumulation of sludge in the crankcase and on the cylinder walls, thereby preventing sticking of the piston rings, and the formation of varnish-like coating on the pistons and cylinder walls. Because of their general function of maintaining a clean engine, additives of this nature are termed "detergents" although it is now understood that they have little utility in cleaning a dirty engine but by virtue of dispersant activity prevent or greatly retard engine fouling.

As cleanliness requirements have called for greater concentrations of detergent additives, the problem of ash deposition in the combustion chamber has become more serious. Especially is this a problem in certain engines which tend to develop violent preignition troubles in the presence of metal-containing ash. These problems have increased the importance and desirability of using "ashless" detergents.

An "ashless" detergent is one which shows substantially no ash when tested by ASTM procedure D-482-59T. The only possible source of metal when using such an additive is that of corrosion products and trace quantities present in some crude oils. It can be generally stated that metal-containing deposits in an engine (1) contribute to valve burning, (2) contribute to preignition, (3) tend to foul and short-out spark plugs, and (4) tend to increase octane requirements. Use of conventional metal-containing detergents can contribute to the deposit of metal-containing materials in the combustion chamber. Metal-containing deposits do not form from ashless detergents. Use of an ashless detergent, therefore, materially reduces the problems normally encountered in internal combustion engines in connection with metal-containing deposits.

It has been found that low molecular weight hydrogenated liquid polymers of conjugated dienes containing low levels of combined nitrogen have improved detergent and dispersant properties. Thus, broadly speaking, the present invention resides in the hydrogenated reaction products obtained when a normally liquid low molecular weight polymer of a conjugated diene is reacted with acrylonitrile and is hydrogenated as new additives for motor fuels and lubricants; methods of preparing said new additives; and motor fuel and lubricant compositions containing said new additives.

An object of this invention is to provide an ashless additive for lubricants.

Another object of this invention is to provide improved additives exhibiting reduced deposit-forming tendencies in motor fuels.

Another object of this invention is to provide a method for the preparation of additives for motor fuels.

Another object of this invention is to provide improved motor fuel compositions utilizing the additives of the invention.

Other aspects, objects, and the several advantages of the invention will be apparent to those skilled in the art upon studying this disclosure and the appended claims.

Thus, according to the invention, there is provided new compositions comprising the oil-soluble reaction product or products obtained upon hydrogenating an adduct formed from normally liquid low molecular weight polydiolefin and acrylonitrile.

Further, according to the invention, there is provided a process for producing an additive for motor fuels and lubricants which process comprises forming an adduct from a low molecular weight polymer of a conjugated diolefin and acrylonitrile and then hydrogenating the adduct thus formed to form said additive.

Further, according to the invention, there is provided as a new additive for motor fuels and lubricants a product additive obtained by the process described in the preceding paragraph.

Still further, according to the invention, there is provided a new motor fuel composition comprising a major proportion of a motor fuel and a minor proportion of a new additive in accordance with the invention.

As indicated hereinbefore, this invention relates to the preparation and use of polymeric compounds containing low levels of combined nitrogen useful as additives for gasoline and motor fuels. In general, the polymeric compounds contain from about 0.1 to about 3 weight percent, preferably from about 0.5 to about 1 weight percent, of combined nitrogen. The additive compounds of this invention are formed by reacting low molecular weight polydiolefins with acrylonitrile to form an adduct by the "ene reaction."

The "ene reaction" is described by H. M. R. Hoffman in Angew. Chem. Internat. Edit. 8, (No. 8) 556–577 (1969). The adduct is subsequently hydrogenated to remove from about 55 percent to about 95 percent or more of the olefinic unsaturation and all of the nitrile unsaturation.

The low molecular weight polydiolefins contemplated as starting materials are normally liquid polymers having molecular weights ranging from about 500 to about 5,000. They are prepared from conjugated dienes containing from about 4 to 12 carbon atoms per molecule and include 1,3-butadiene, isoprene, 1,3-pentadiene, 2,3-dimethyl-1,3-pentadiene, 2-phenyl-1,3-butadiene, and 4,5-diethyl-1,3-octadiene. Presently preferred polymers are prepared from 1,3-butadiene and isoprene.

The butadiene polymers preferably have a vinyl content ranging from about 20 to about 70 percent and the isoprene polymers preferably have an isopropenyl content ranging from about 20 to about 70 percent. The polymers can be prepared from the monomers contained in a diluent using an alkyllithium initiator and a polar compound such as water, amines, etc., to obtain the desired molecular weight. A second polar compound such as tetrahydrofuran can be added to provide the desired amount of side-chain unsaturation. U.S. Pat. No. 3,324,191, for example, describes how the low molecular weight polymers can be produced.

A wide variety of reaction conditions can be employed in the practice of the invention in the preparation of the adduct and the subsequent hydrogenation of the adduct. Any reaction conditions under which the reactions involved in the invention will take place are within the scope of the invention. Similarly, any proportions of reactants which will react with each other to produce a product additive of the invention are within the scope of the invention. However, as will be understood by those skilled in the art in view of this disclosure, certain reaction conditions and reactant proportions are favored for economic reasons, i.e., the reactions proceed faster and give greater yields for some reaction conditions and some proportions of reactants. The reaction or reactions involved in preparing the product additives of the invention can be carried out in the presence or absence of a non-reactive diluent which is inert in this process, i.e., does not react with the reactants or reaction products.

The adduct of the above-described low molecular weight polymers with acrylonitrile is prepared by contacting the polymer and acrylonitrile in a polymer to acrylonitrile molar ratio of about 1 to 2 to about 1 to 20, with about 1 to 3 to about 1 to 10 being preferred. Said contacting is done under any conditions of time, temperature, and pressure which result in the desired product. Ordinarily, the reaction temperatures will be in the range of about 150° to 300° C, preferably 175° to 250° C. Reaction times will be about 5 to about 50 hours. Any convenient pressure can be used which is sufficient to insure that some of the acrylonitrile is in the liquid phase. That is, the pressure should be equal to or greater than the vapor pressure of the acrylonitrile and/or diluent at the reaction temperature used. It is sometimes desirable to pressurize the reaction zone with inert gas to maintain the adduct-forming reactants predominantly in the liquid phase, for example, from 0 to about 2,000 psig.

On occasion, it is desirable to employ a non-reactive diluent in the production of the adduct. Such diluents include saturated aliphatic and cycloaliphatic hydrocarbons, aromatic hydrocarbons, etc. The presently preferred mode of operation is in the presence of such a diluent. Such diluents include n-heptane, n-hexane, cyclohexane, benzene, toluene, and the like, and mixtures thereof.

The adduct of polymer and acrylonitrile can be isolated and purified by any convenient means such as fractional distillation, precipitation, solvent extraction, etc. However, it is currently preferred to employ the crude reaction mixture for hydrogenation to produce the inventive composition.

The adduct is hydrogenated to remove from about 55 percent to about 95 percent or more of the olefinic unsaturation and substantially all of the nitrile unsaturation.

During preparation of the adduct it is desirable to include a soluble antioxidant to prevent or minimize polymerization of acrylonitrile that might occur during the reaction. Such antioxidants can be hindered phenols such as 2,6-di-t-butyl-methylphenol, 1,3,5-trimethyl-2,4,6-tris(3,5-di-t-butyl-4-hydroxybenzyl)benzene, and the like. Any remaining antioxidant is removed during workup of the adduct.

During hydrogenation of the adduct it is sometimes desirable to conduct the reaction in the presence of ammonia to minimize or prevent loss of nitrogen from the adduct that might occur. A quantity of ammonia somewhat in excess of the nitrogen combined in the adduct is used.

The hydrogenation can be carried out in any manner known in the art, such as the process of U.S. Pat. No. 2,864,809, R. V. Jones et al., issued Dec. 16, 1958, or that of U.S. Pat. No. 3,113,986, D. S. Breslow et al., issued Dec. 10, 1963, or that of U.S. Pat. No. 3,205,278, S. J. Lapporte, issued Sept. 7, 1965. For example, the polymer adduct can be hydrogenated over a reduced nickel-kieselguhr catalyst or over a nickel octoate-triethylaluminum catalyst system. Ordinarily, the hydrogenation reaction temperature will be in the range of about 20° to about 200° C. Reaction times will be about one to about 30 hours or whatever time is required to hydrogenate at least about 55 percent of the olefinic bonds. Reaction pressures will be about 100 to about 1000 psig of hydrogen.

On occasion, it is desirable to employ a non-reactive diluent in the hydrogenation of the adduct. Such diluents include n-heptane, n-hexane, cyclohexane, benzene, toluene, dioxane, tetrahydrofuran, and the like, and mixtures thereof.

Following hydrogenation the reactor is cooled to about 25° C, the contents are removed and the catalyst is removed by filtration, if insoluble, or if soluble a suitable treatment is employed to remove it. For example, a homogeneous nickel (O) catalyst can be separated by oxidizing it in the presence of dibasic ammonium phosphate to form insoluble nickel phosphate which is removed by filtration. The hydrocarbon phase of the filtrate is separated and is stripped of diluent to obtain the crude product.

If the currently preferred reaction conditions are employed, no further isolation or purifications steps are necessary in order to use the product in gasoline or lubricating oil formulations. It is currently preferred to employ the crude reaction mixture following hydrogenation for such purposes as described above without subsequent treatment. In some cases, however, it may be desirable to isolate and purify the product. Such may be accomplished by any methods currently known in the art.

The compositions of this invention, when used as a motor fuel additive, are added directly to motor fuels in either a purified state or as a crude reaction mixture as hereinbefore described. The quantity of additive utilized is in the range of about 0.001 to about 0.3, preferably about 0.02 to about 0.1 weight percent additive based on motor fuel. When a motor fuel containing this additive is utilized in conventional internal combustion engines, the buildup of hard refractory deposits on intake valves is substantially diminished. In addition, the additive in motor fuels is effective as an upper cylinder lubricant, a carburetor cleaner, a solvent for valve deposits, and a fuel line cleaner.

The motor fuels or gasolines into which the invention additives are dispersed are conventional motor fuel distillates boiling in the range of 70°–420° F (21.1°–216° C). Gasolines or automotive fuels to which the described additives perform the functions described include substantially all grades of gasoline presently being employed in automotive and internal combustion aircraft engines. Generally, automotive and aircraft gasolines contain both straight-run and cracked stock with or without alkylated hydrocarbons, reformed hydrocarbons, and the like. Such gasolines can be prepared from saturated hydrocarbons, e.g., straight-run stocks, alkylation products, and the like, with or without gum inhibitors and with or without soluble lead compounds as, for example, tetraethyl lead (T.E.L.) or ethyl fluid. The gasolines may contain as much as about 5 ml of T.E.L. per gallon, such amounts being used commercially in aviation gasolines. These can be leaded or nonleaded and can contain other conventional fuel additives such as antioxidants and the like.

The compositions of this invention are oil-soluble and can be incorporated in motor fuels and lubricating oil formulations in combinations depending on specific service requirements. For example, in many general duty crankcase oil applications, the additives of the invention can be blended with appropriate base oils and other additives to provide high quality lubricating oils which meet the requirements and specifications for their intended use.

The lubricating oils to which the invention compositions can be added include any suitable mineral oils of lubricating viscosity, such as those used for compounding lubricating oils of SAE 10 to SAE 50 viscosity. These oils can be derived from suitable naphthenic, paraffinic, and mixed base crudes. The lube oils can also contain other additives such as thickeners and the like.

Generally speaking, the additives of this invention can be added to a base lubricating oil in any amount sufficient to produce the desired degree of improvement. For example, the additives can be used in amounts ranging from 0.2 to 30 weight percent of the finished oil. A presently preferred concentration of product additive is in the range of about 1 to about 10 weight percent of finished oil.

The effectiveness of the additives as carburetor detergents in gasoline can be assessed in the laboratory by adding known weight of the additive, usually about 0.05 weight percent, to 400 ml of lead-free gasoline containing 0.04 weight percent sulfurized terpene (Santolube ®395-X, Monsanto Company, St. Louis, MO) to increase gum deposits. The gasoline is sprayed through a nozzle onto a weighed dish heated to 375° F. Provisions are made to safely remove fumes such as by a vacuum line. In the test, the gasoline flow rate is 2 ml/minute which is atomized by air flowing at the rate of 30 cubic feet/hour. After 100 ml or 250 ml of fuel has been sprayed, the fuel supply is cut off and the test dish is removed and washed twice in boiling heptane, followed by a heptane rinse. Remaining solvent is evaporated and the dish weighed. The weight increase is reported as mg/100 ml or mg/250 ml depending upon the amount of fuel sprayed onto the dish. Additives in the gasoline showing detergency effects in this test (spray gum test) will decrease the amount of gum formed, and a relative rating for additives can be ascertained readily.

EXAMPLE I

To a reactor was added 40.0 grams of liquid polyisoprene with a number average molecular weight obtained by gel permeation chromatography of 2400 and exhibiting 55 percent isopropenyl content dissolved in 78 grams of benzene, 5.0 grams of redistilled acrylonitrile, and 0.01 grams of the antioxidant, 2,6-di-t-butyl-4-methylphenol. The contents of the reactor were stirred and heated for 15 hours at 220° C, then the reactor was cooled and the contents were drained and filtered. The resulting material was stripped of benzene and unreacted acrylonitrile under a vacuum to obtain 41.8 grams of the "ene" reaction product. After only partial hydrogenation of the reaction product dissolved in dioxane with a catalyst comprising 5 weight percent rhodium supported on alumina was obtained, the hydrogenation was continued in the presence of a pre-reduced ruthenium catalyst and a small amount of anhydrous ammonia at 160° C and partial pressure of hydrogen to 1700 psig. Infrared-absorption spectroscopy indicated that about 85 percent of the olefinic double bonds were hydrogenated and no detectable nitrile unsaturation remained. The product was analyzed and evaluated as a carburetor detergent additive for gasoline using the spray-gum test. The results are presented in the table as Run 3.

EXAMPLE II

A sample of the same polyisoprene used in the first example weighing 21.3 grams was dissolved in 87.8 grams of benzene and charged to the reactor. Also added to the reactor was 3.2 grams of redistilled acrylonitrile and 0.006 grams of 2,6-di-t-butyl-4-methylphenol. The contents of the reactor were stirred at a temperature of 220° C for 20 hours, the reactor was cooled, and the contents were drained and filtered as before. After vacuum stripping of the "ene reaction" product to remove benzene and unreacted acrylonitrile, 21.8 grams of product were recovered. A 3-gram portion of the product was dissolved in cyclohexane and hydrogenated in the presence of a preformed homogeneous nickel hydrogenation catalyst at 160° C with a hydrogen partial pressure of about 1500 psig. Following hydrogenation, the reactor was cooled and the contents removed. The nickel (O) catalyst contained in the sample was air oxidized to $Ni^{+2}$, precipitated as nickel phosphate, and filtered. The filtrate was vacuum stripped to remove the solvent, and 2.8 grams of product was obtained. Analyses of the product by infrared-absorption spectroscopy and nuclear magnetic resonance techniques indicated that about 66 percent of the olefinic double bonds were hydrogenated and no detectable nitrile unsaturation remained. The product was analyzed and evaluated as a carburetor detergent additive for gasoline using the spray-gum test. The results are presented in the table as Run 4.

EXAMPLE III

To the reactor was charged 26.2 grams of liquid polybutadiene having a number average molecular weight of 1900 as determined by gel permeation chromatography and a vinyl content of 55 percent dissolved in 89.5 grams of benzene. Also added to the reactor was 3.3 grams of redistilled acrylonitrile and 0.008 grams of 2,6-di-t-butyl-4-methylphenol. The reactor contents were stirred 20 hours at 220° C, the reactor was cooled, and the contents drained and filtered. After vacuum stripping the resulting product to remove solvent and unreacted acrylonitrile, 27.5 grams of product were recovered. The product was dissolved in cyclohexane, hydrogenated at 1500 psig partial pressure hydrogen at 160° C in the presence of a preformed homogeneous nickel hydrogenation catalyst and freed from solvent and catalyst as described in Example II to yield 27.0 grams of product. Analyses of the product by the infrared and nuclear magnetic resonance techniques as before disclosed indicated that about 60 percent of the carbon-to-carbon double bonds were hydrogenated and no nitrile unsaturation remained. The product was analyzed and evaluated as a carburetor detergent additive for gasoline using the spray-gum test. The results are given in the table as Run 7.

EXAMPLE IV
(Control Runs)

The liquid polymers prepared in Examples I and III were used without hydrogenation for controls in the spray-gum test and data are shown as Runs 1 (polyisoprene) and 5 (polybutadiene) in the following table. In addition, a portion of each polymer was hydrogenated, the polyisoprene over a five weight percent rhodium on alumina catalyst and the polybutadiene over a homogeneous nickel catalyst using the methods previously described for hydrogenation and isolation of the products. Each hydrogenated polymer, polyisoprene as Run 2 and polybutadiene as Run 6, was also given the spray-gum test. The results are given in the table. Each additive was tested as a 0.05 weight percent solution in lead-free gasoline.

Hydrogenation of the olefinic unsaturation in the polymers was substantially complete as determined by nuclear magnetic resonance techniques.

based on the spray-gum test. However, when nitrogen is incorporated chemically into the structure of the polydiolefins by practicing this invention, a dramatic improvement in gum reduction is noted as inventions runs 3, 4, and 7 clearly show.

We claim:

1. An internal combustion fuel composition comprising a major proportion of motor fuel containing a small but effective amount, sufficient to impart detergency and reduced deposit-forming tendency to said motor fuel, of an additive which is an oil-soluble hydrogenated polymeric reaction product containing from about 0.1 to about 3 weight percent of combined nitrogen obtained upon reacting
   (a) a normally liquid low molecular weight polymer of a conjugated diene with
   (b) acrylonitrile to form an adduct, said diene and acrylonitrile present in an amount such that the molar ratio of conjugated diene to acrylonitrile is in the range of about 1 to 2 to about 1 to 20, and
   (c) hydrogenating said adduct to remove about 55 to about 95 percent of the olefinic unsaturation and substantially all of the nitrile unsaturation.

2. A composition according to claim 1 wherein the motor fuel contains from about 0.001 to about 0.3 weight percent of said additive.

3. A composition according to claim 1 wherein the motor fuel is a distillate boiling in the range of about 70° F to about 420° F (21.1°–216° C).

4. A composition according to claim 1 wherein said additive is the reaction product obtained upon reacting (a) a polymer of a conjugated diene having from 4 to 12 carbon atoms and a molecular weight of about 500 to about 5,000 with acrylonitrile.

5. A composition according to claim 1 wherein

TABLE

| Run | 1 | 2 | 3 | 4 | 5 | 6 | 7 |
|---|---|---|---|---|---|---|---|
| | | Evaluation Results of Additives For Carburetor Detergent Utility | | | | | |
| Additive | PI Not hydrog. | PI hydrog. | PI-ACN hydrog. | PI-ACN hydrog. | PBd Not hydrog. | PBd hydrog. | PBd-ACN hydrog. |
| Molecular Weight | 2400 | 1850 | 2065 | 1500 | 1900 | 1400 | 1800 |
| Weight Percent: | | | | | | | |
| Carbon | 88.2 | 85.6 | 86.0 | 86.3 | 88.8 | 85.7 | ND |
| Hydrogen | 11.8 | 14.4 | 13.3 | 12.9 | 11.2 | 14.3 | ND |
| Nitrogen | 0 | 0 | 0.7 | 0.8 | 0 | 0 | 0.6 |
| *Spray-Gum Test | | | | | | | |
| Mg Gum Per 100 ml | 0.5 | 3.8 | 0.3 | 0.0 | 1.4 | 2.2 | 0.2 |

Notes:
PI is polyisoprene.
ACN is acrylonitrile.
PBd is polybutadiene.
hydrog. is hydrogenated.
ND is not determined.
*Fuel containing no carburetor detergent gave an average of 4.2 mg gum/100 ml fuel.

The molecular weight of each polydiolefin raw material, Runs 1 and 5, was determined by gel permeation chromatography. The molecular weight of the remaining samples, Runs 2,3,4,6, and 7, was determined by osmometry. It is thought that the variation noted in the table above is possibly due to small amounts of solvent still remaining in the vacuum stripped samples. The elemental analysis results are believed to be representative of each sample, however. The data presented in the table show that either the raw polymers or hydrogenated polymers are ineffective as carburetor detergents additive is the reaction product obtained upon reacting (a) a polymer of butadiene or isoprene with acrylonitrile.

6. An internal combustion fuel according to claim 1 comprising a major proportion of hydrocarbons in the gasoline boiling range of 70° to about 420° F (21.1°–216° C) and from about 0.001 to about 0.3 weight percent of an additive which is the reaction product of (a) a polymer of butadiene or isoprene with acrylonitrile.

* * * * *